United States Patent
Igarashi et al.

[11] Patent Number: 6,108,218
[45] Date of Patent: Aug. 22, 2000

[54] SWITCHING POWER SUPPLY WITH POWER FACTOR CONTROL

[75] Inventors: Seiki Igarashi; Akio Suzuki, both of Tokyo, Japan

[73] Assignee: Fuji Electric Co., Ltd., Kawasaki, Japan

[21] Appl. No.: 09/234,261

[22] Filed: Jan. 20, 1999

[30] Foreign Application Priority Data

Feb. 27, 1998 [JP] Japan .................................. 10-046891

[51] Int. Cl.[7] .................................................. H02M 3/335
[52] U.S. Cl. ............................................................ 363/21
[58] Field of Search ................................ 363/21, 97, 131, 363/132

[56] References Cited

U.S. PATENT DOCUMENTS

| | | | |
|---|---|---|---|
| 5,122,946 | 6/1992 | Taylor | 363/21 |
| 5,673,184 | 9/1997 | Rilly et al. | 363/21 |
| 5,757,626 | 5/1998 | Jovanovic | 363/21 |
| 5,862,043 | 1/1999 | Youn et al. | 363/21 |
| 5,883,795 | 3/1999 | Farrington | 363/21 |

FOREIGN PATENT DOCUMENTS 07015967  1/1995  Japan .

*Primary Examiner*—Shawn Riley
*Attorney, Agent, or Firm*—Baker Botts, L.L.P.

[57] ABSTRACT

A switching power supply for achieving a high power factor includes a rectifier Rect 1, a DC voltage source (capacitor) C1, a transformer TR1, a diode D6; a diode D7 a semiconductor switch Q1, and a inductor L1. The DC voltage source C1 is connected to an AC power supply AC via the rectifier Rect1. The transformer TR1 includes a primary winding N1, a secondary winding N2 and a tertiary winding N3. The transformer TR1 and the semiconductor switch Q1 are used to output an insulated DC voltage from the DC voltage source C1. The tertiary winding N3 is between the output of the rectifier Rect1 and the DC voltage source C1. The diodes D6 and D7 are connected to the respective input terminals of an AC power supply. The inductor L1 is connected between the output of the diodes D6, D7 and the semiconductor switch Q.

9 Claims, 5 Drawing Sheets

SWITCHING POWER SUPPLY WITH POWER FACTOR CONTROL

BACKGROUND OF THE INVENTION

1. Field of the Invention

The present invention relates to switching power supplies and more particularly relates to a switching power supply that feeds DC electric power from a DC voltage source to a load via a transformer with an improved power factor.

2. Description of the Prior Art

FIG. 5 is a circuit diagram of a conventional switching power supply known in the art. Referring to FIG. 5, the conventional switching power supply includes a rectifier circuit Rect 1, a transformer TR1, a capacitor C1 and a semiconductor switch Q1. The semiconductor switch is controlled by a conventional switching controller 510, such as a pulse width modulator. The rectifier circuit Rect 1 is a bridge rectifier circuit composed of diodes D1 through D4. The input of the rectifier circuit Rect 1 is connected to terminals 502, 504 which are connectable to an external source of AC voltage. The transformer TR1 includes a primary winding N1, a secondary winding N2 and a tertiary winding N3. The output of the rectifier Rect 1 is connected to the capacitor C1 via the tertiary winding N3 of the transformer TR1. A series circuit composed of the primary winding N1 of the transformer TR1 and the semiconductor switch Q1 is connected in parallel to the capacitor C1. A capacitor C2 is connected to the secondary winding N2 of the transformer TR1 via a diode D5. Output terminals 506, 508 are connected across capacitor C2 and provide points of connection for an external load (not shown).

By switching the semiconductor switch Q1 to an on state, the electric power stored in the capacitor C1 is transferred to the transformer TR1 through the path connecting the capacitor C1, the primary winding N1 of the transformer TR1 and the semiconductor switch Q1. Next, by switching the semiconductor switch Q1 to an off state, the electric power stored in the transformer TR1 is transferred to the capacitor C2 via the secondary winding N2 and the diode D5. When the semiconductor switch Q1 is switched off, a voltage is generated across the tertiary winding N3 that is N3/N2 (the winding ratio of the tertiary winding and the secondary winding) times as high as the voltage of the capacitor C2. When the sum of the input voltage Vac applied to terminals 502, 504 and the voltage VN3 of the tertiary winding N3 exceeds the voltage VC1 of the capacitor C1, a current flows from the AC power supply. By boosting the voltage of the tertiary winding N3 the period during which the input current flows is extended and, therefore, the power factor is improved.

FIG. 6(a) shows the input voltage and current waveforms of the switching power supply of FIG. 5 for an input voltage of 100 VAC. FIG. 6(b) shows the input voltage and current waveforms of the switching power supply of FIG. 5 for an input voltage of 200 VAC.

In the conventional switching power supply shown in FIG. 5, the increasing rate of the conduction period of the input current is determined by the ratio VN3/VC1, where VN3 is the voltage of the tertiary winding N3 and VC1 is the voltage of the capacitor C1. The voltage VN3, determined by the voltage obtained by multiplying the output voltage VC2 and the winding ratio N3/N2, does not change with respect to the input voltage Vac. The voltage VC1 is equal to the sum of the peak value of the voltage Vac and the voltage VN3 of the tertiary winding N3, i.e., VC1=SQRT(2).Vac+VN3. Therefore, the power factor is high as shown in FIG. 6(a) when the input voltage is 100 V. However, the power factor is lowered, as shown in FIG. 6(a), for the input voltage of 200 V.

If the voltage VN3 of the tertiary winding N3 is boosted to improve the power factor at the input voltage of 200 V, the peak value of the voltage VC1 of the capacitor C1 also rises. Generally, the typical breakdown voltage of an electrolytic capacitor is around 450 V. To withstand the boosted peak voltage of the capacitor C1, a plurality of electrolytic capacitors must be connected in series to reduce the voltage across each capacitor. However, such a series connection of multiple electrolytic capacitors enlarges the dimensions and increases the costs of the switching power supply.

OBJECTS AND SUMMARY OF THE INVENTION

In view of the foregoing, it is an object of the invention to provide a switching power supply that improves the power factor without enlarging its dimensions and increasing its costs.

According to a first embodiment of the invention, a switching power supply is provided including: input terminals for connection to an external AC power supply, a rectifier having an input connected to the input terminals and an output; a DC voltage source; a transformer including a primary winding, a secondary winding and a tertiary winding, the tertiary winding being connected in series between the output of the rectifier and the input of the DC voltage source, a semiconductor switch, the transformer and the semiconductor switch cooperating to generate an isolated DC voltage from the DC voltage source. The switching power supply further includes first and second diodes connected to the input terminals and connected together to form an output and an inductor connected from the output of the diodes and the semiconductor switch.

Preferably, the DC voltage source is a first capacitor.

Advantageously, the switching power supply further includes a plurality of diodes connected in series and a second capacitor. The series connected diodes are connected in parallel with the DC voltage source. The second capacitor is connected between the output of the diodes and a connection point of the series connected diodes.

According to another embodiment of the invention, a switching power supply is provided including: a rectifier; a DC voltage source, a transformer including a primary winding, a secondary winding, a tertiary winding and a quaternary winding and a main switch connected in series to the primary winding. The transformer and the main switch cooperate to generate and output an isolated DC voltage from the DC voltage source. The switching power supply also includes a snubber capacitor connected in parallel to the main switch, a diode and an auxiliary switch. The quaternary winding, the diode and the auxiliary switch are connected in series to discharge the snubber capacitor.

According to still another embodiment of the invention, a switching power supply is provided including: first and second input terminals for connection to an external AC power source, a rectifier circuit having an input and an output, the input being connected across the first and second input terminals, a first DC voltage source and a first transformer including a first primary winding and a first secondary winding. The switching power supply also includes a second DC voltage source connected in parallel to the first secondary winding and a main switch connected in series with said first primary winding. The first transformer and main switch generate an isolated DC voltage from the first DC voltage source. A snubber capacitor is included and is connected in parallel to the main switch. Further included are A first diode, a second diode, an auxiliary switch and a second transformer including a second primary winding and a second secondary winding. The second primary winding, first diode and auxiliary switch are connected in a series circuit which is operatively coupled to discharge the snubber capacitor. The second secondary winding is connected to one of the first DC voltage source and said second DC voltage source via the second diode.

A current flows through the inductor circuit inserted between the diodes connected between the input terminals of AC power supply and the switching element by switching on the switching element. The current flows from the AC power supply to the switching element via one of the diodes and the inductor. Since this current path has no relation with the voltage of the capacitor working as a DC voltage source, the current flows even when the input AC voltage is low. A current flows with a power factor of 1 through the above inductor. As the input AC voltage is raised, a higher current flows through the inductor. Power factor improvement by the voltage of the tertiary winding is more effective when the input AC voltage is lower. Power factor improvement by the above inductor circuit is more effective when the input AC voltage is higher. As a result of the combination of the above two effects, substantially constant power factor improvement is achieved irrespective of whether the input AC voltage is low or high.

The additional circuit that uses an auxiliary switch provides for zero-voltage switching which reduces the switching loss, resulting in an improved operating efficiency.

BRIEF DESCRIPTION OF THE DRAWINGS

The present invention will be explained hereinafter with reference to the accompanying drawing figures which illustrate preferred embodiments of the invention. Throughout these figures, like parts are designated by the same reference numerals and their duplicated explanations will be omitted for the sake of clarity.

DETAILED DESCRIPTION OF PREFERRED EMBODIMENTS

Figure 1:
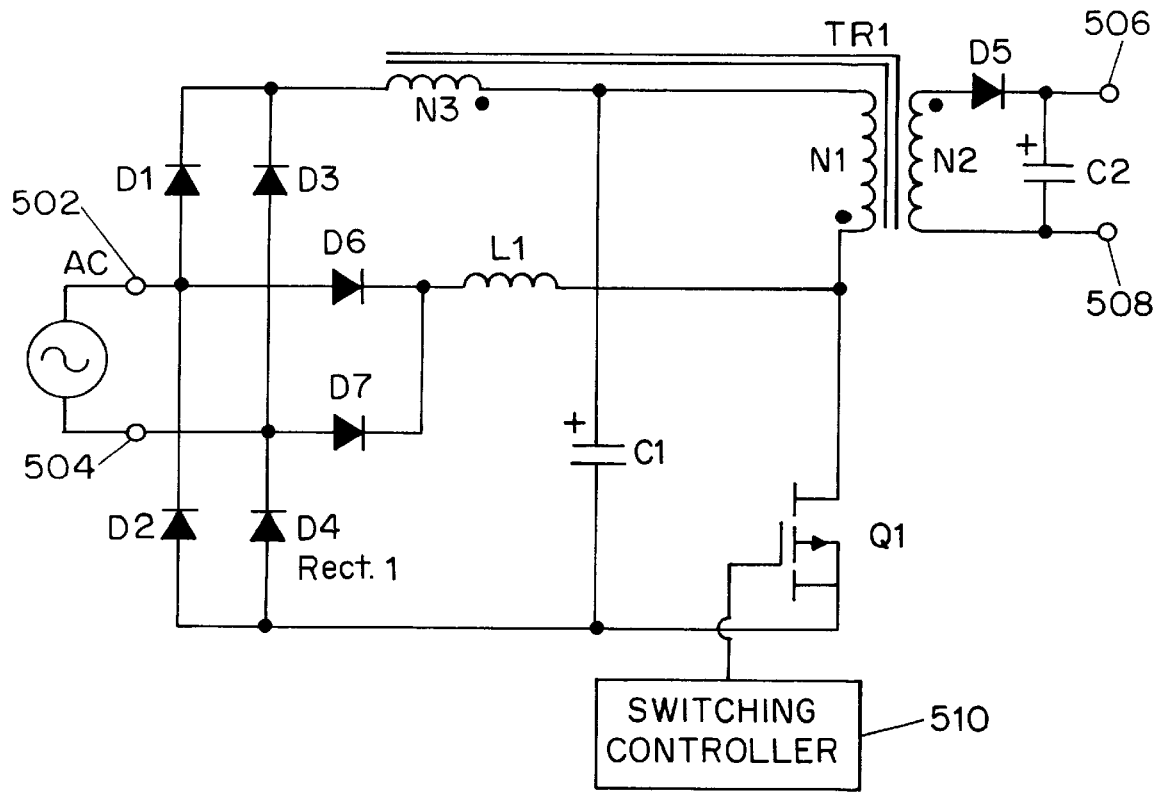
FIG. 1 is a circuit diagram of a switching power supply according to a first embodiment of the invention.

FIG. 1 is a circuit diagram of a switching power supply formed in accordance with a first embodiment of the invention. In addition to the circuitry described in connection with FIG. 5, the switching power supply of FIG. 1 includes diodes D6, D7 and an inductor L1. A terminal of diode D6 is connected to the connection point of the diodes D1 and D2. A terminal of diode D7 is connected to the connection point of the diodes D3 and D4. The other terminals of the diodes D6 and D7 are short-circuited to each other. The inductor L1 is connected between the switching element Q1 and the short-circuited terminals of the diodes D6 and D7.

Figure 5:
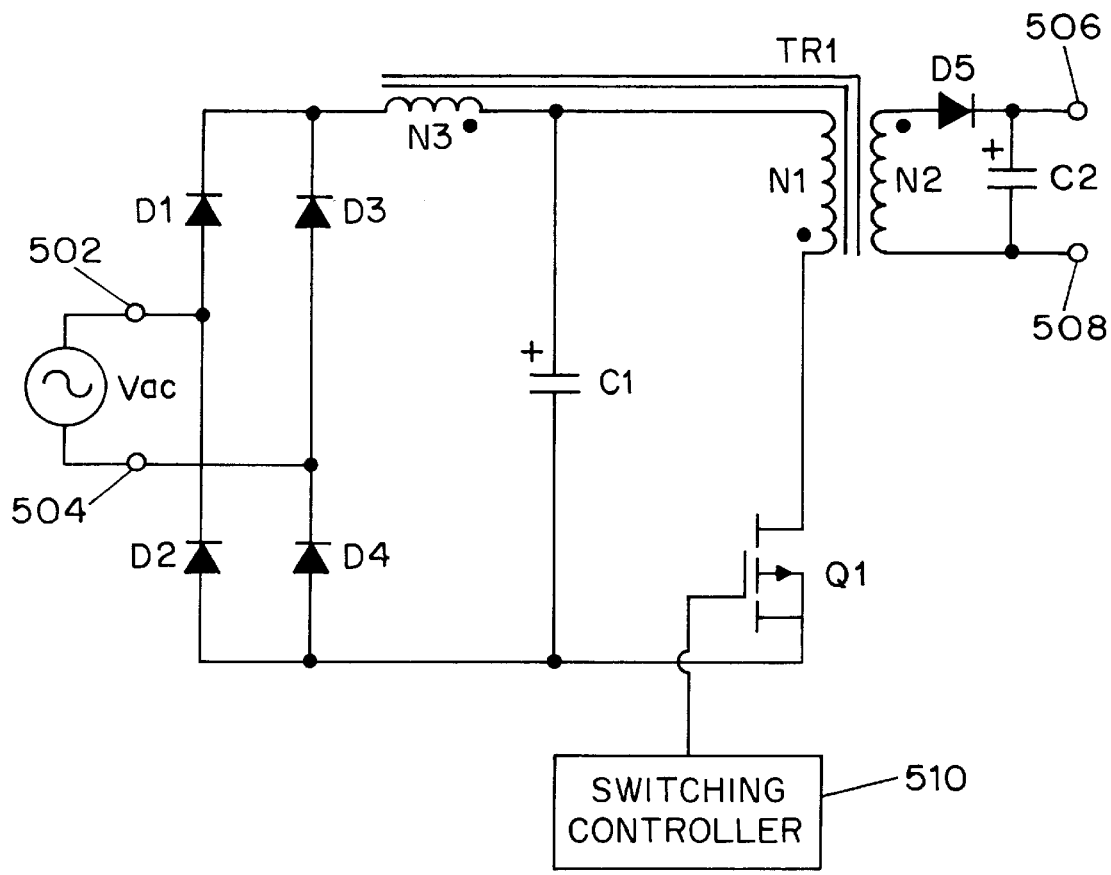
FIG. 5 is a circuit diagram of a conventional switching power supply circuit.

In FIG. 1, section of the power supply circuit composed of the transformer TR1 and the switching element Q1 operates in the same manner as described in connection with the conventional circuit of FIG. 5. In addition, the circuit of FIG. 1 also includes additional current paths which circulate a current from one terminal connected to the AC power supply back to the other terminal connected to the AC power supply. Depending on the phase of the AC signal, a current will circulate around the AC power supply in one of two paths. First, a current can flow from the junction of diodes D1, D2 through the diode D6, the inductor L1, the switching element Q1 and the diode D4, returning to the AC power supply at the junction of diodes D3, D4 in association with the switching-on of the switching element Q1. Alternatively, in an opposite phase of the input signal, a current can flow from the AC power supply at the junction of diodes D3, D4 through the diode D7, the inductor L1, the switching element Q1 and the diode D2 in association with the switching-on of the switching element Q1. Since the voltage of the capacitor C1 is not related with the above current paths, the circuit of FIG. 1 provides a path for a current flow even when the AC voltage is low.

When the switching element Q1 is switched off, the energy stored in the inductor L1 is fed to the transformer TR1 and the capacitor C1 through the path connecting the inductor L1, the primary winding N1, the capacitor C1, the diode D2, the diode D6 and the inductor L1. Alternatively, the energy stored in the inductor L1 is fed to the transformer TR1 and the capacitor C1 through the path connecting the inductor L1, the primary winding N1, the capacitor C1, the diode D4, the diode D7 and the inductor L1.

Figure 6A:
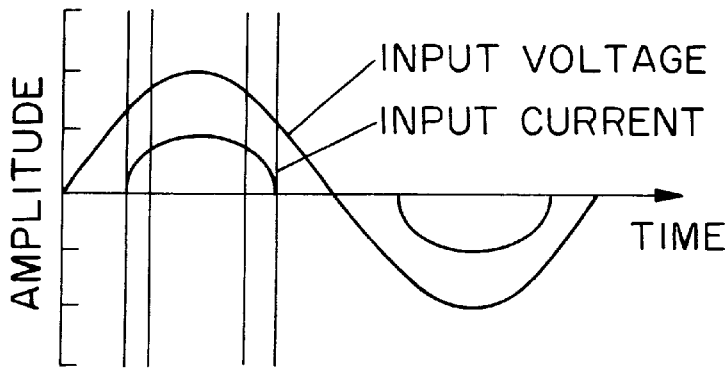
FIG. 6(a) is a timing diagram showing the input voltage and current waveforms of the switching power supply of FIG. 5 for an applied input voltage of 100 VAC.
Figure 6B:
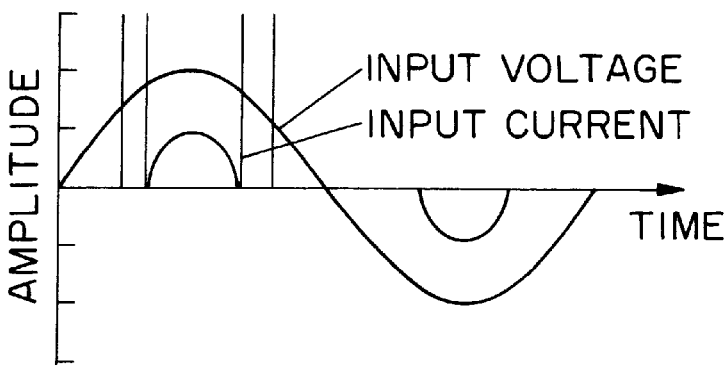
FIG. 6(b) is a timing diagram showing the input voltage and current wave forms of the switching power supply of FIG. 5 for an applied input voltage of 200 VAC.
Figure 6C:
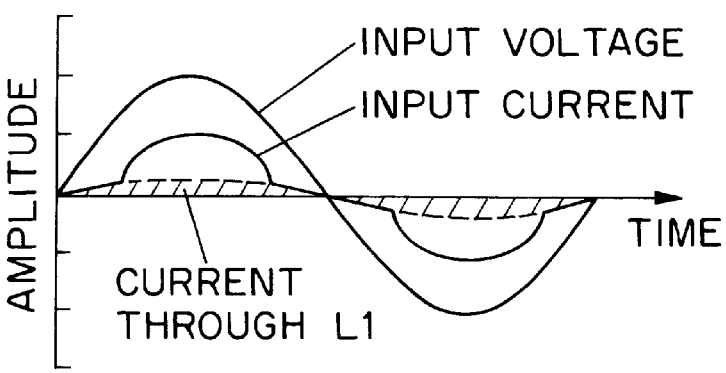
FIG. 6(c) is a timing diagram showing the input voltage and current wave forms of the switching power supply of FIG. 1 for an applied input voltage of 100 VAC.
Figure 6D:
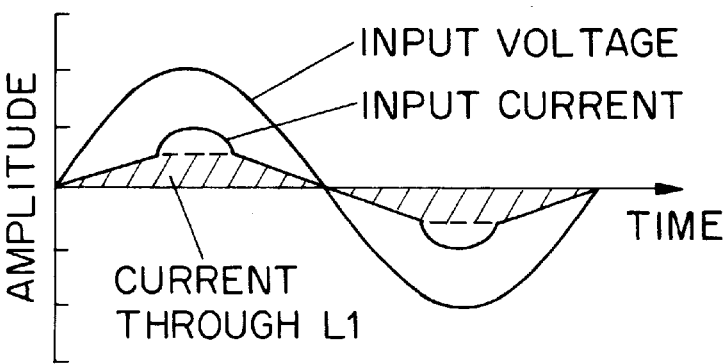
FIG. 6(d) is a timing diagram showing the input voltage and current wave forms of the switching power supply of FIG. 1 for an applied input voltage of 200 VAC.

FIG. 6(c) shows the input voltage and current wave forms of the switching power supply of FIG. 1 for an input voltage of 100 VAC. FIG. 6(d) shows the input voltage and current wave forms of the switching supply of FIG. 1 for applied input voltage of 200 VAC. As shown in these figures, a current flows with a power factor of 1 with respect to the AC voltage through the inductor L1. That is, as the AC voltage is increased, a higher current flows. The power factor improvement resulting from the voltage of the tertiary winding N3 is more pronounced as the AC voltage is lowered. However, the power factor improvement resulting from the inductor L1 is more pronounced as the AC voltage becomes higher. As a combined result of the above two effects, substantially constant power factor improvement is realizable irrespective of whether the input voltage is low or high.

Preferably, the reactance of the inductor L1 is high enough to improve the power factor only when the input voltage is high. When this is the case, the high reactance presented by the inductor L1 suppresses the current to a small value. As a result, the conduction loss increase in the switching element Q1 is reduced, thereby enabling the use of low power capacity components for the inductor L1 and the diodes D6, D7.

Figure 2:
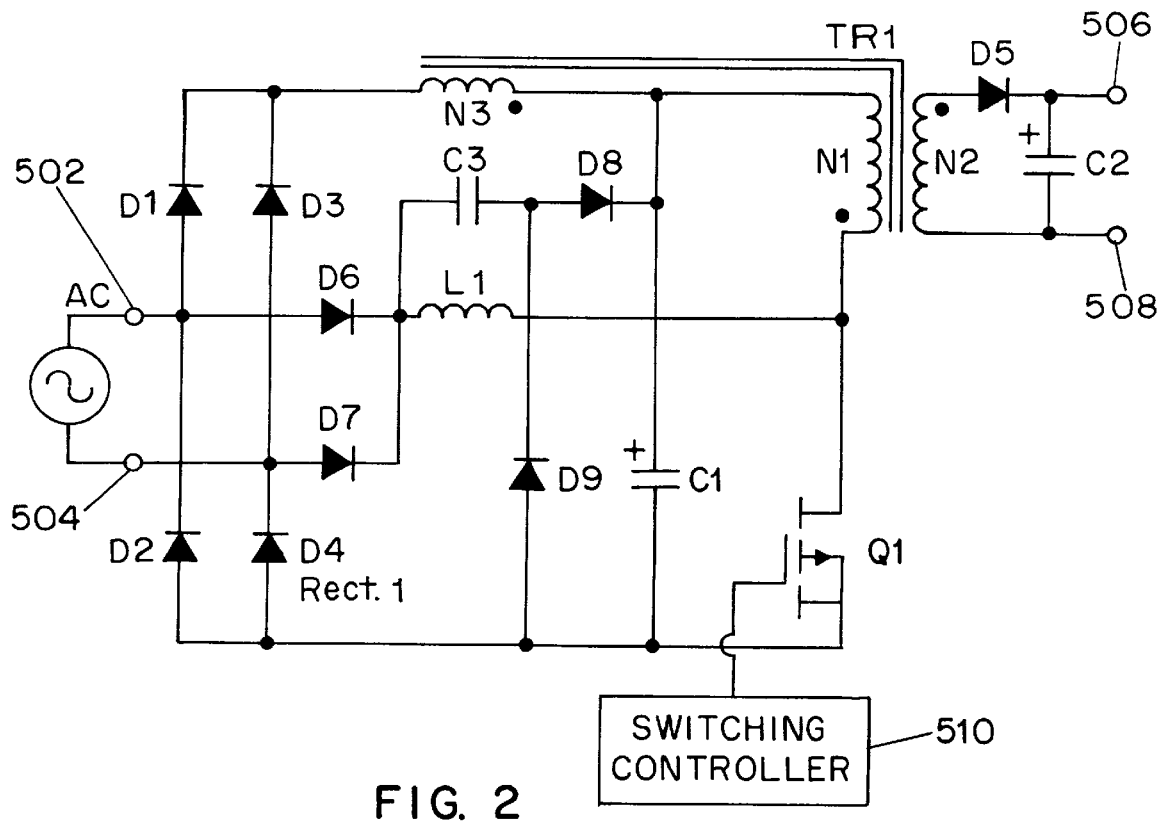
FIG. 2 is a circuit diagram of a switching power supply according to a second embodiment of the invention.

FIG. 2 is a circuit diagram of a switching power supply formed in accordance with a second embodiment of the invention. In addition to the circuitry described in connection with FIG. 1, the circuit of FIG. 2 includes diodes D8 and D9 which are connected to each other in a series circuit which is connected in parallel to the capacitor C1. A capacitor C3 is also included and is connected between the connection point of the diodes D6, D7 and the inductor L1 and the connection point of diodes D8 and D9.

In FIG. 2, the circuit composed of the transformer TR1 and the switching element Q1 works in the same manner as described in connection with the conventional circuit of FIG. 5. In addition, while the switching element Q1 is off, charges are stored in the capacitor C3 by a reverse recovery current of the diode D6 or the diode D7 in such a polarity that is positive on the inductor L1 side of the capacitor C3. Then, by turning on the switching element Q1 to an on state, the stored charges are transferred to the inductor L1 through the path connecting the capacitor C3, the inductor L1, the switching element Q1, and the diode D9. By subsequently switching the switching element Q1 to the off state, the energy stored in the inductor L1 is fed to the transformer TR1 and the capacitor C1 through the path connecting the inductor L1, the primary winding N1, the capacitor C1, the diode D2, the diode D6 and the inductor L1. Alternatively, the energy stored in the inductor L1 is fed to the transformer TR1 and the capacitor C1 through the path connecting the inductor L1, the primary winding N1, the capacitor C1, the diode D4, the diode D7 and the inductor L1. When the energy feed is completed, resulting in a zero inductor current, the diode D6 (or D7) executes reverse recovery of the voltages of the capacitor C1 and the primary winding N1 of the transformer TR1. When a reverse bias voltage is applied between the anode and cathode of the diode D6 (or D7) in association with its reverse recovery, a reverse recovery current flows from the inductor L1 to the capacitor C1 via the capacitor C3 and the diode D8. This current charges the capacitor C3 with a polarity that is positive on the inductor L1 side of the capacitor C3.

Since the circuit of FIG. 2 makes the current of the inductor L1 flow to the AC power supply after it has been increased by the voltage of the capacitor C3, the current flows even when the voltage of the AC power supply is zero. Thus, the conduction period is extended. Since the capacitor C3 can absorb the current of the inductor L1 caused by the reverse recovery of the diode D6 (or D7), the capacitor C3 works to suppress the peak reverse recovery voltage of the diode D6 (or D7).

Figure 3:
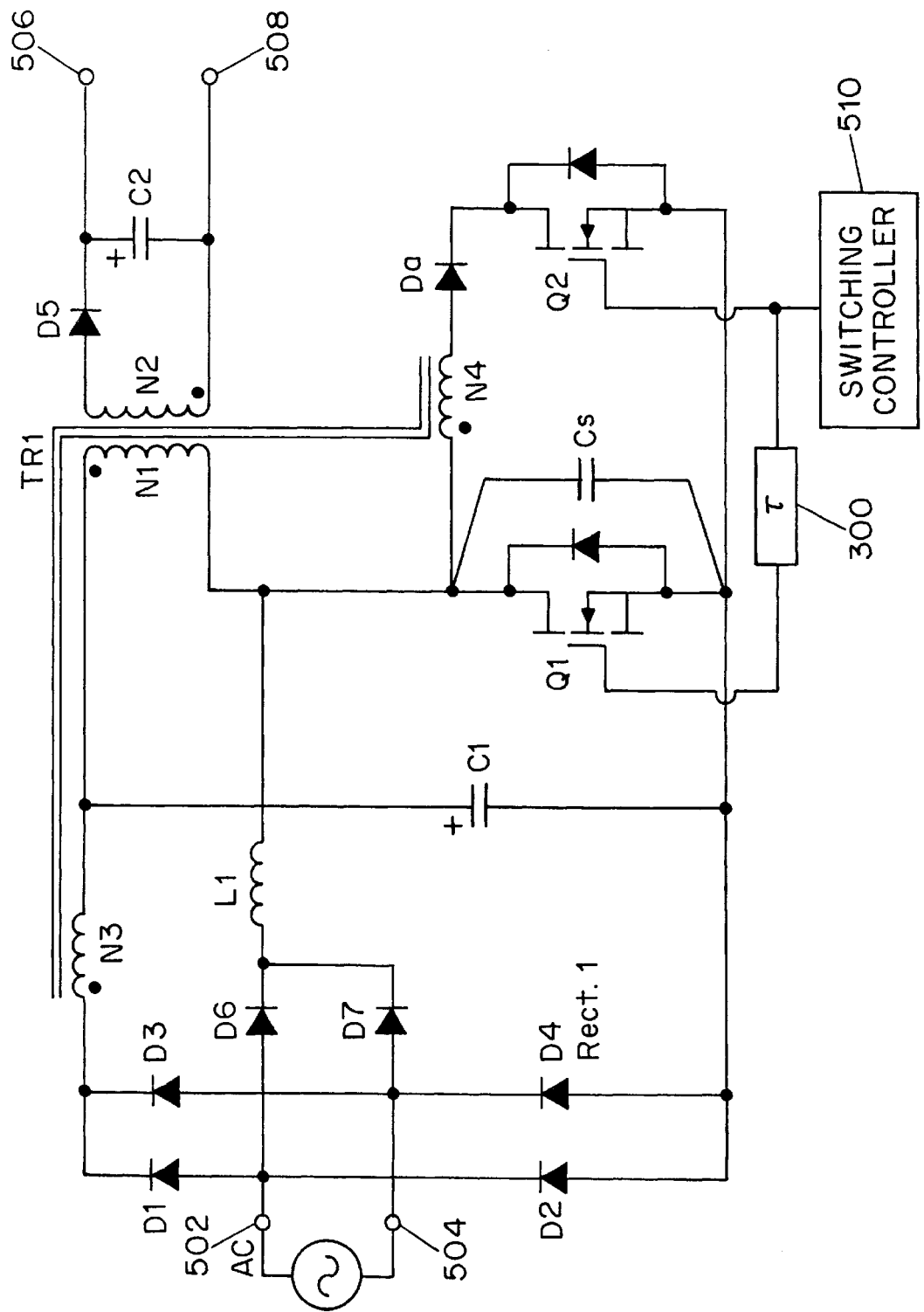
FIG. 3 is a circuit diagram of a switching power supply according to a third embodiment of the invention.

FIG. 3 is a circuit diagram of a switching power supply circuit formed in accordance with a third embodiment of the invention. In addition to the circuitry described in connection with FIG. 1, the switching power supply of FIG. 3 includes a snubber capacitor Cs as well as a series circuit composed of a quaternary winding N4 of the transformer TR1, a diode Da and a switching element Q2. This series circuit is connected in parallel to the switching element Q1. Hereinafter, the switching elements Q1 and Q2 will be referred to as the "main switch" and the "auxiliary switch," respectively.

By switching the auxiliary switch Q2 to an on state in advance of switching the main switch Q1 to the on state, the charges stored in the snubber capacitor Cs are discharged via the quaternary winding N4, the diode Da and the auxiliary switch Q2. This switch timing can be performed with the addition of time delay circuit 300 inserted between the output of the switch controller 510 and the main switch while driving the auxiliary switch directly with the switch controller 510. Since the discharge current energizes the quaternary winding N4, a charge is stored in the transformer TR1 as excitation energy and is discharged via the primary winding N1 and the capacitor C1. By switching on the main switch Q1 after the snubber capacitor Cs has been discharged, the main switch Q1 executes zero-voltage switching, which exhibits minimal switching loss.

The voltage of the snubber capacitor Cs is zero when the main switch Q1 is subsequently switched off. Since the current that has flowed through the main switch Q1 now flows to and charges up the snubber capacitor Cs, a voltage is applied to the switch Q1. Therefore, the main switch Q1 interrupts the current at zero volts, resulting in zero-voltage switching. Therefore, minimal switching loss results.

Thus, the circuit shown in FIG. 3 achieves zero-voltage switching and, therefore, results in highly efficient operation. The diodes D1 through D7, the inductor L1 and the tertiary winding N3 of the transformer TR1 contribute to power factor improvement similarly as described in connection with FIG. 1.

Figure 4:
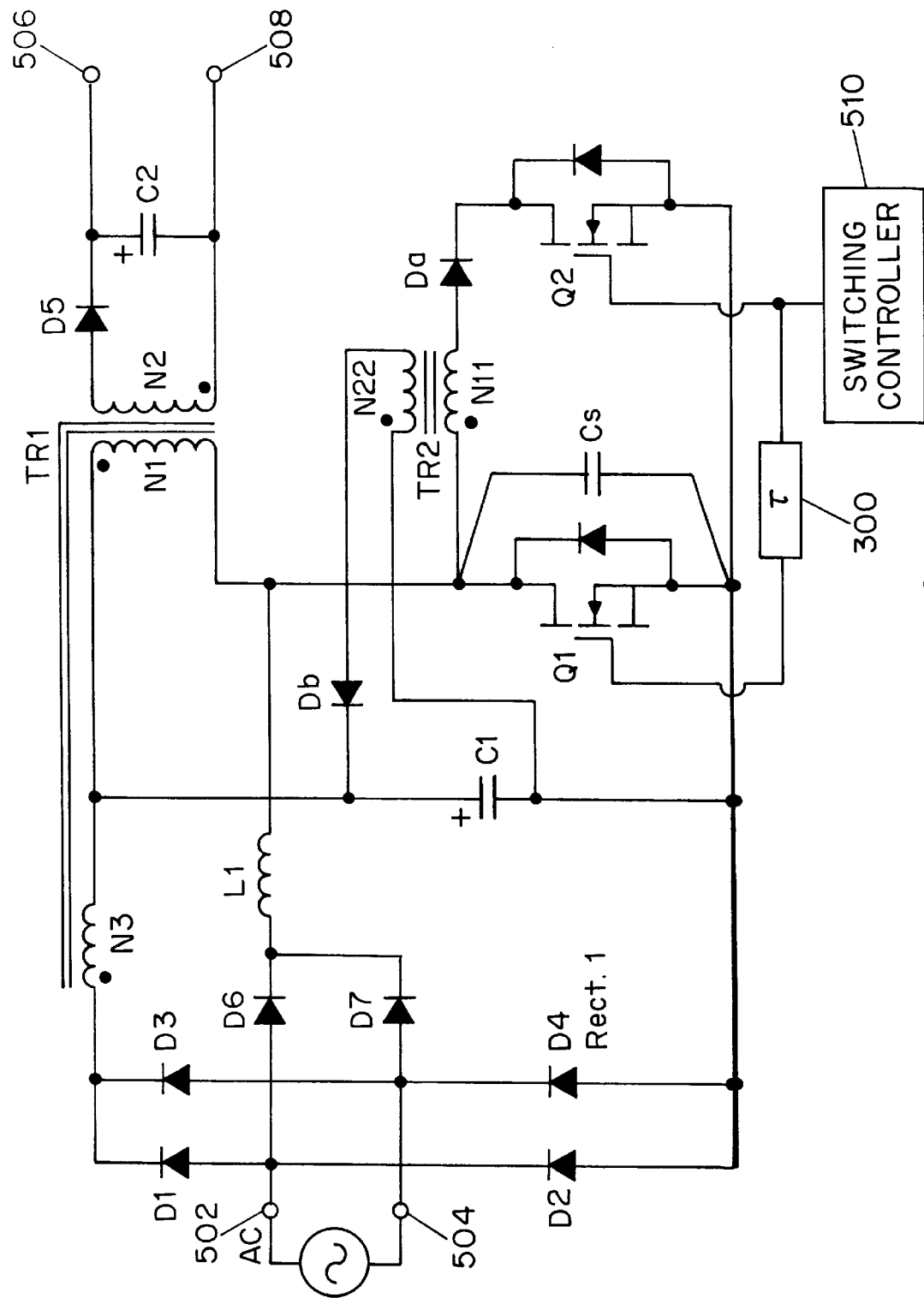
FIG. 4 is a circuit diagram of a switching power supply according to a fourth embodiment of the invention.

FIG. 4 is a circuit diagram of a switching power supply circuit formed in accordance with a fourth embodiment of the invention. The circuit shown in FIG. 4 is a modification of the circuit of FIG. 3. Referring to FIG. 4, the switching power supply includes a second transformer TR2 having a primary winding N11 that substitutes for the quaternary winding N4 in FIG. 3 and a secondary winding N22 connected to the capacitor C1 via a diode Db. Alternatively, the secondary winding N22 of the second transformer TR2 may be connected to the DC voltage source C2 on the load side via the diode Db.

By switching the auxiliary switch Q2 to an on state in advance of switching on the main switch Q1, the charge stored in the snubber capacitor Cs is discharged through the primary winding N11, the diode Da and the auxiliary switch Q2. The discharge current results in the storage of excitation energy in the transformer TR1. By switching on the main switch Q1 after the voltage of the snubber capacitor Cs has become zero, the main switch executes zero-voltage switching. By switching off the auxiliary switch Q2, the excitation energy stored in the second transformer TR2 is regenerated from the secondary winding N22 to the capacitor C1 via the diode Db.

The voltage of the snubber capacitor Cs is zero when the main switch Q1 is switched off. Since the current that has flowed through the main switch Q1 now flows to and charges up the snubber capacitor Cs, a voltage is applied to the switch Q1. Therefore, the main switch Q1 interrupts the current at zero volts, resulting in zero-voltage switching. Therefore, minimal switching loss is incurred. Thus, the circuit shown in FIG. 4 achieves zero-voltage and, therefore, operates in a highly efficient manner.

Although the invention has been explained above in connection with the embodiments of the fly-back-type converter, the present invention is applicable also to forward converters. As explained above, the power factor is improved, and the dimensions and costs of the switching power supply are reduced by additional small parts such as an inductor and diodes. The additional circuit that uses an auxiliary switch to achieve zero-voltage switching in the main switch reduces the switching loss, resulting in an improved power factor and reduced dimensions of the inductor and related component parts.

What is claimed is:

1. A switching power supply comprising:

first and second input terminals for connection to an external AC power source;

a rectifier circuit, said rectifier circuit having an input and an output, the input being connected across said first and second input terminals;

a DC voltage source;

a transformer including a primary winding, a secondary winding and a tertiary winding, said tertiary winding being interposed between the output of said rectifier and said DC voltage source;

a semiconductor switch;

said transformer and said semiconductor switch outputting an isolated DC voltage from said DC voltage source;

first and second diodes, said first and second diodes being operatively coupled to said first and second input terminals respectively, said first and second diodes being connected together to form an output of said diodes;

a series circuit including a plurality of diodes, said series circuit being connected in parallel with said DC voltage source;

a capacitor, said capacitor being connected between the output of said first and second diodes and a connection point of said plurality of diodes connected in series; and an inductor, said inductor being interposed between the output of said first and second diodes and said semiconductor switch.

2. The switching power supply according to claim 1, wherein said DC voltage source is a capacitor.

3. A switching power supply comprising:

first and second input terminals for connection to an external AC power source;

a rectifier circuit, said rectifier circuit having an input and an output, the input being connected across said first and second input terminals;

a DC voltage source;

a transformer including a primary winding, a secondary winding, a tertiary winding and a quaternary winding;

a main switch connected in series with said primary winding, said transformer and said main switch outputting an isolated DC voltage from said DC voltage source;

a snubber capacitor connected in parallel to said main switch;

a diode; and an auxiliary switch, said quaternary winding, said diode and said auxiliary switch being connected as a series circuit, said series circuit being connected in parallel with said snubber capacitor to discharge said snubber capacitor.

4. The switching power supply according to claim 3, wherein said DC voltage source is a capacitor.

5. A switching power supply comprising:

first and second input terminals for connection to an external AC power source;

a rectifier circuit, said rectifier circuit having an input and an output, the input being connected across said first and second input terminals;

a first DC voltage source;

a first transformer including a first primary winding and a first secondary winding;

a second DC voltage source connected in parallel to said first secondary winding;

a main switch connected in series with said first primary winding;

said first transformer and said main switch being for outputting an isolated DC voltage from said first DC voltage source;

a snubber capacitor connected in parallel to said main switch;

a first diode;

a second diode;

an auxiliary switch; and a second transformer including a second primary winding and a second secondary winding, said second primary winding, said first diode and said auxiliary switch being connected in a series circuit, said series circuit being operatively coupled to said snubber capacitor to discharge said snubber capacitor, said second secondary winding being connected to one of said first DC voltage source and said second DC voltage source via said second diode.

6. The switching power supply according to claim 5, wherein said first DC voltage source is a capacitor.

7. The switching power supply according to claim 5, wherein said second DC voltage source is a capacitor.

8. A switching power supply comprising:

first and second input terminals for connection to an external AC power source;

a rectifier circuit, said rectifier circuit having an input and an output, the input being connected across said first and second input terminals;

a DC voltage source;

a transformer including a primary winding, a secondary winding and a tertiary winding, said tertiary winding being interposed between the output of said rectifier and said DC voltage source;

a semiconductor switch;

a series circuit, said series circuit being formed of said primary winding and said semiconductor switch, said series circuit being connected across said DC voltage source;

first and second diodes, said first and second diodes being operatively coupled to said first and second input terminals respectively, said first and second diodes being connected together to form an output of said diodes;

an inductor, said inductor being interposed between the output of said first and second diodes and said semiconductor switch, whereby a current flows from said AC power source to said inductor when said semiconductor switch is ON;

a capacitor, said capacitor being connected across said secondary winding; and a third diode, said third diode being interposed between said secondary winding and said capacitor, said third diode preventing current flow through said secondary winding when said semiconductor switch is ON;

whereby a voltage established across said tertiary winding when said semiconductors switch if OFF, said voltage across said tertiary winding having the same polarity as the polarity of a rectified voltage outputted from said rectifier circuit; and whereby a current flow is established from said AC power source to said DC voltage source through said tertiary winding when said semiconductor is OFF and the sum of said voltage across said tertiary winding and said rectified voltage exceeds the voltage of said DC voltage source.

9. The switching power supply according to claim 8, wherein said DC voltage source is a capacitor.

* * * * *

UNITED STATES PATENT AND TRADEMARK OFFICE
CERTIFICATE OF CORRECTION

PATENT NO. : 6,108,218
DATED : August 22, 2000
INVENTOR(S) : Igarashi et al.

It is certified that error appears in the above-identified patent and that said Letters Patent is hereby corrected as shown below:

Title page,
Item [54], "SWITCHING POWER SUPPLY WITH POWER CONTROL FACTOR" should read -- SWITCHING POWER SUPPLY HAVING IMPROVED POWER FACTOR --

Column 1,
Line 1, "SWITCHING POWER SUPPLY WITH POWER CONTROL FACTOR" should read -- SWITCHING POWER SUPPLY HAVING IMPROVED POWER FACTOR --

Signed and Sealed this

Thirteenth Day of November, 2001

Attest:

NICHOLAS P. GODICI
Attesting Officer *Acting Director of the United States Patent and Trademark Office*